(12) United States Patent
Simic

(10) Patent No.: US 11,268,798 B2
(45) Date of Patent: Mar. 8, 2022

(54) FISHING ROD RULER

(71) Applicant: Michele Simic, Gladstone (AU)

(72) Inventor: Michele Simic, Gladstone (AU)

( * ) Notice: Subject to any disclaimer, the term of this patent is extended or adjusted under 35 U.S.C. 154(b) by 243 days.

(21) Appl. No.: 16/096,774

(22) PCT Filed: Apr. 26, 2017

(86) PCT No.: PCT/AU2017/050376
§ 371 (c)(1),
(2) Date: Oct. 26, 2018

(87) PCT Pub. No.: WO2017/185130
PCT Pub. Date: Nov. 2, 2017

(65) Prior Publication Data
US 2019/0120605 A1  Apr. 25, 2019

(30) Foreign Application Priority Data
Apr. 26, 2016 (AU) .............................. 2016901527

(51) Int. Cl.
*G01B 3/1084* (2020.01)
*A01K 87/00* (2006.01)
*G01B 3/1003* (2020.01)

(52) U.S. Cl.
CPC .......... *G01B 3/1084* (2013.01); *A01K 87/007* (2013.01); *G01B 3/1004* (2020.01); *G01B 2003/1097* (2013.01)

(58) Field of Classification Search
CPC ................ G01B 3/1084; G01B 3/1004; G01B 2003/1097; A01K 87/007
See application file for complete search history.

(56) References Cited

U.S. PATENT DOCUMENTS

| | | | | |
|---|---|---|---|---|
| 461,106 A | * | 10/1891 | Oberly | A01K 87/00 43/18.1 R |
| 1,255,269 A | * | 2/1918 | Zinkiewiez | G01G 3/02 177/232 |
| 1,973,403 A | * | 9/1934 | Borden | B44C 1/175 156/246 |
| 2,137,456 A | * | 11/1938 | Palm, Jr. | B41M 3/12 428/199 |
| 2,746,877 A | * | 5/1956 | Matthes | B44C 1/1704 428/200 |

(Continued)

FOREIGN PATENT DOCUMENTS

AU  2001100076 A4 * 7/2001
GB  2304264 B  8/1999
(Continued)

OTHER PUBLICATIONS

International Search Report and Written Opinion for International Application No. PCT/AU2017/050376, filed Apr. 26, 2017, entitled "Fish Rod Ruler", dated Jun. 2, 2017.

(Continued)

*Primary Examiner* — Nimeshkumar D Patel
*Assistant Examiner* — Tania Courson
(74) *Attorney, Agent, or Firm* — Hamilton, Brook, Smith & Reynolds, P.C.

(57) ABSTRACT

A fishing rod ruler including an elongate flexible body with a number of length markings provided thereon, the elongate flexible body to be at least temporarily applied to a fishing rod.

21 Claims, 2 Drawing Sheets

(56) References Cited

U.S. PATENT DOCUMENTS

| | | | | |
|---|---|---|---|---|
| 2,816,655 A * | 12/1957 | Macdonald | C09J 7/201 | 428/41.8 |
| 3,297,508 A * | 1/1967 | Jahp | B44C 1/162 | 156/249 |
| 3,298,850 A * | 1/1967 | Lythgoe | B44C 1/162 | 428/155 |
| 3,660,196 A * | 5/1972 | Keeling | B44C 1/17 | 156/235 |
| 3,791,841 A * | 2/1974 | Carmellini | B44C 1/1756 | 428/40.9 |
| 4,149,320 A | 4/1979 | Troyer et al. | | |
| 4,995,188 A * | 2/1991 | Ewing | A01K 87/007 | 43/23 |
| 6,115,932 A * | 9/2000 | Fedora | A01K 97/00 | 33/758 |
| 6,251,087 B1 * | 6/2001 | Sandifer | A61B 5/1074 | 600/592 |
| 6,520,876 B1 | 2/2003 | Eastman, II | F42B 6/04 | 428/36.91 |
| 6,901,674 B2 * | 6/2005 | Pieczynski | A01K 97/00 | 33/511 |
| 6,959,499 B2 * | 11/2005 | Bini | A01K 97/00 | 33/511 |
| 7,605,332 B2 * | 10/2009 | Winkler | A01K 97/08 | 177/25.13 |
| 7,665,220 B1 * | 2/2010 | Gee | A01K 97/00 | 33/511 |
| 8,431,838 B2 * | 4/2013 | Bond | G01G 19/60 | 177/131 |
| 9,080,848 B1 * | 7/2015 | Gold | G01B 5/02 | |
| 9,578,863 B2 * | 2/2017 | Ostfeld | G01B 3/1003 | |
| 10,004,213 B2 * | 6/2018 | Britz | A01K 87/08 | |
| 10,426,150 B2 * | 10/2019 | Yokoyama | B41J 2/2132 | |
| 10,598,474 B1 * | 3/2020 | Petrash | G01B 5/02 | |
| 10,856,534 B2 * | 12/2020 | Waters | A01K 97/00 | |
| 2008/0083152 A1 * | 4/2008 | Wang | A01K 87/007 | 43/18.1 R |
| 2010/0064539 A1 | 3/2010 | Jacobs | | |
| 2010/0077649 A1 * | 4/2010 | Giacobbe | A01K 87/00 | 43/25 |
| 2012/0324751 A1 * | 12/2012 | Wakeman | A01K 97/00 | 33/759 |

FOREIGN PATENT DOCUMENTS

| | | | |
|---|---|---|---|
| JP | 05153886 | * | 6/1993 |
| JP | 06024119 A | * | 2/1994 |
| JP | 2001333664 A | * | 12/2001 |
| KR | 20160066305 A | * | 6/2016 |
| WO | 2017185130 A1 | | 11/2017 |

OTHER PUBLICATIONS

The Rod Ruler [retrieved from internet on May 26, 2017]: http://tacklejunkie fish/rod-ruler/ published Feb. 24, 2015, whole document.

Berkley® Rod Ruler—30 inch [retrieved from internet on Jun. 23, 2017]: http://www.berkley-fishing.com/berkley-tools-and-equipment-catch-management-berkley-fishingear/berkleyrod-ruler—30-inch/1285945.html Published Jun. 23, 2017, whole document.

The Original RodRule™ http://www.rodrule.com/ [retrieved from internet on May 26, 2017]: Published Oct. 12, 2002, whole document.

JRW Rod Ruler [retrieved from internet on May 26, 2017]: http://www.jrwfishing.com/rodruler.htm Published Nov. 2, 2007.

* cited by examiner

FISHING ROD RULER

This application is the U.S. National Stage of International Application No. PCT/AU2017/050376, filed Apr. 26, 2017, which designates the U.S., published in English, and claims priority under 35 U.S.C. § 119 or 365(c) to Australian Patent Application No. 2016901527, filed Apr. 26, 2016. The entire teachings of the above applications are incorporated herein by reference.

TECHNICAL FIELD

The present invention relates generally to fishing tackle or accessories and particularly to a ruler device that be attached to or integrated with a fishing rod.

BACKGROUND ART

One known fishing ruler is a ¼"×36" (approximately 6.5 mm wide×92 cm long) clear decal a user can apply directly onto a fishing rod. This type of ruler is a transparent, self-adhesive vinyl decal fish which allows the colour of the rod to show through with only the ¼" (approximately 6.5 mm) increment marks visible. The flexible material used conforms to the curves of fishing rods and does not effect the action. The prior art fishing rulers can be cut to the desired length prior to application to the fishing rod.

The vinyl film used in making the prior art ruler is a thin, flexible, self-adhesive material. Users are advised to be very careful during the removal of the back-liner and while applying to the rod as any stretching of the vinyl will distort the accuracy and the vinyl material is easily stretched.

In order to apply the prior art ruler to a fishing rod, a user is first advised to identify where they want to position the ruler on the fishing rod, and all indications provided by the manufacturer are to apply above the upper grip of the rod or above the upper reel mount towards the butt end of the fishing rod. If required, a user can cut down to a smaller size using a sharp scissors to cut to length. Users are advised to have a sharp knife or razor blade handy if the device is to extend over any ferrules (breaks in a two piece rod).

It will be clearly understood that, if a prior art publication is referred to herein, this reference does not constitute an admission that the publication forms part of the common general knowledge in the art in Australia or in any other country.

SUMMARY OF INVENTION

The present invention is directed to a fishing rod ruler and a fishing rod with a ruler, which may at least partially overcome at least one of the abovementioned disadvantages or provide the consumer with a useful or commercial choice.

With the foregoing in view, the present invention in one form, resides broadly in a fishing rod ruler including an elongate flexible body with a number of length markings provided thereon, the elongate flexible body to be at least temporarily applied to a fishing rod.

In another form, the present invention resides in a fishing rod with a ruler incorporated there into, the fishing rod having an elongate body with a number of length markings provided thereon, the fishing rod ruler provided beneath at least one finishing layer of resin or lacquer used to finish the fishing rod.

In another form, the present invention resides in a method of forming a fishing rod with a ruler incorporated thereinto, including the steps of providing a fishing rod having an elongate body with a number of length markings provided thereon, positioning the fishing rod ruler adjacent to a portion of the fishing rod and applying at least one finishing layer used to finish the fishing rod over the fishing rod ruler and at least an adjacent part of the fishing rod.

The fishing rod ruler of the present invention is preferably self-adhesive, normally sold on a removable backing sheet or substrate but under some circumstances, may be provided as a non-adhesive flexible body.

The fishing rod ruler of the present invention may be provided in the form of a body with markings which are transferable onto the fishing rod ruler with the application of the flexible body to the fishing rod only temporarily whilst the markings are transferred onto the fishing rod relative (called a decal or transfer). This can be accomplished through provision of a plastic, cloth, paper or ceramic body that has printed on it, a pattern or image of the desired length markings that can be moved to another surface upon contact, possibly with the aid of heat or water or pressure.

In one particularly preferred form, the elongate flexible body may be provided with one or more shaped cutouts in order to allow temporary application of the body to the fishing rod ruler and to allow a contrasting paint or similar type of marking material to be applied over the top of the elongate flexible body in order to provide markings on to the fishing rod. Once the contrasting paint or similar type of marking material has dried or set or similar onto the fishing rod, the elongate fix the body may then be removed, leaving the markings directly applied to an external surface of the fishing rod.

The fishing rod ruler of the present invention may be used in the manufacture of the fishing rod thereby incorporating the fishing rod ruler into the construction of the fishing rod with at least one finishing layer of resin or lacquer applied above the fishing rod ruler. This integration of the fishing rod ruler is preferred where possible because it will typically remove or at least prevent delamination of the fishing rod ruler from the fishing rod which may occur if the fishing rod ruler is provided in an adhesive form and only applied to an external surface of the fishing rod.

The elongate flexible body of the ruler of the present invention is preferably manufactured from a plastic material or similar. Normally the body will be elongate. The length of the elongate body may vary according to the type of fishing rod to which the body is to be at least temporarily applied. Normally, the body will be at least 12 inches in length (approximately 30 cm) and although any length can be used depending upon the length of the rod, will preferably up to 90 cm in length.

The elongate flexible body may have any shape, but will normally be substantially rectangular (albeit, in a preferred form, with one or more shaped portion is adapted for removal from the flexible body or with lines of weakness of frangibility).

The width of the elongate flexible body is particularly important given that the body will be at least temporarily applied to a cylindrical out of surface of a fishing rod which also typically tapers from the butt end of the fishing rod to the tip end of the fishing rod.

In a preferred form, the elongate flexible body of the present invention will typically be applied relative to a tip portion of the fishing rod and extend from the tip down the length of the fishing rod toward the butt. The tip end of the fishing rod is normally quite narrow which can cause application problems. The tip end of the fishing rod is also provided with a tip guide as well as one or more body guides which are mounted relative to the fishing rod and generally incorporated into the fishing rod via one or more feet and mounting aims. Therefore, the elongate flexible body of the present invention will also typically be required to provide for the location and number of the guides and particularly, the feet and mounting aims of each of the guides. In practice, the guides are not all spaced equally from the tip, nor other guides on different fishing rods provided in the same positions relative to the tip.

The application of the elongate flexible body of the present invention to the tip end of the fishing rod rather than the butt end of the fishing rod will typically mean that the ruler of the present invention is easier to use to measure fish because the user will not have to be concerned with any interaction of the fish with the reel of the fishing rod.

Alternatively, the rod ruler may be applied to or relative to the butt end.

Further, because fishing rods taper, the rod ruler may also taper from wider at one end, normally located closer to the butt end of the rod to narrower at the opposite end normally located closer to the butt end of the rod. In this form, the ruler will be elongate but trapezoidal in order to better fit on the rod which is larger at the butt than at the tip.

In a preferred form, the elongate flexible body is preferably provided with at least one, and typically a number of shaped cutout portions provided, preferably on both lateral side edges of the elongate flexible body and/or at least one end edge, in order to account for the guides, particularly the guide feet and arms on the fishing rod. Alternatively, one or more incisions, lines of weakness or frangible portions may be provided on, preferably both lateral side edges and/or at least one end edge of the elongate flexible body to provide for the guides of the fishing rod.

Alternatively, a number of shaped crenellations or similar may be provided, preferably on both lateral side edges of the elongate flexible body and/or on at least one end edge of the elongate flexible body in order to allow for or account for the guide feet and/or mounting arms giving the external diameter of the tip portion of the fishing rod.

In a preferred form, the shaped cutout portions, crenellations, one or more incisions, lines weakness or frangible portions will typically be offset from the length markings so that the length markings provided on the elongate flexible body are preferably provided in the wider parts of the body so is still to be easily read even if portions of the flexible body are removed. Typically, the shaped cutout portions, crenellations, one or more incisions, lines weakness or frangible portions will alternate down the length of the body to create alternating wider portions on the body and narrower portions on the body.

The body of the ruler of the present invention may be manufactured from any material, but preferably, a non-extensible, non-resilient plastic material is used. The body will typically be flexible in order to be wrapped around a portion of the fishing rod at least temporarily.

The body of the ruler of the present invention will be provided with a number of length markings. Any type of length markings may be provided. It is preferred that the length markings include a number of spaced apart lines or similar in order to indicate length.

In a preferred form, a plurality of spaced apart lines are provided substantially transversely across the body. At least some of the lines will typically be associated with numerals or similar in order to indicate length. The lines may be spaced apart using any length system but preferably, either inches (and/or portions thereof) are used in imperial system or centimetres (and/or portions thereof) are used in SI units. The particular length measuring system used will depend upon the country in which the ruler is sold with some countries preferring the imperial system and some countries preferring the SI system. In a particularly preferred embodiment, where centimetres are used, the length markings will show both centimetres and graduations for half a centimetre and in rulers where inches are used, the length markings will preferably show inches as well as half inch measurements as well as preferably quarter inch measurements.

The length markings may be printed onto the body of the ruler or as explained above, may be provided on the body of the ruler such that the length markings can then be transferred onto the rod or still further, the length markings may be provided on the body of the ruler as a series of cutouts or openings such that a marking material can be used over the body to mark the rod directly and then the body of the ruler removed from the fishing rod.

It is preferred that length markings be easily viewable on the fishing rod in therefore, the length markings may be provided in a particular colour to contrast with the colour of the rod.

The elongate flexible body is at least temporarily applied to a fishing rod. Where the elongate flexible body is self-adhesive, the body may simply be stuck onto an external surface of the fishing rod. However, in other embodiments, it may be that one or more layers of finishing material such as resin or lacquer may be applied over either the body of the ruler in order to integrate the ruler into the construction of the rod or alternatively, over any markings which have been applied to an external surface of the rod in order that the markings be integrated into the construction of the rod.

Integration of the fishing rod ruler into the construction of the rod was such as through the provision of at least one finishing layer of resin or lacquer or similar material is preferred as this will mean the fishing rod ruler is less prone to delamination which may occur with adhering the fishing rod ruler to an external surface of the fishing rod and also make the length markings more some resistant to resist washing off or fading.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DESCRIPTION OF EMBODIMENTS

According to a particularly preferred embodiment of the present invention, a fishing rod ruler and a fishing rod having an integrated fishing rod ruler are provided.

The fishing rod ruler 10 illustrated in the Figures includes an elongate flexible body 11 with a number of length markings 12 provided thereon with the elongate flexible body to be at least temporarily applied to a fishing rod.

Figure 4:
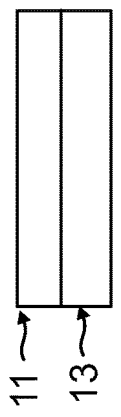
FIG. 4 is a sectional view of a fishing rod ruler of a preferred embodiment on a stripper backing tape prior to removal for application.

The fishing rod ruler of the present invention may self-adhesive and if so, will normally sold on a removable backing sheet or substrate 13 such as is illustrated in FIG. 4. Under some circumstances, may be provided as a non-adhesive flexible body.

The fishing rod ruler of the present invention may be used in the manufacture of the fishing rod thereby incorporating the fishing rod ruler into the construction of the fishing rod with at least one finishing layer 21 of resin or lacquer applied above the fishing rod ruler. This integration of the fishing rod ruler is preferred where possible because it will typically remove or at least prevent delamination of the fishing rod ruler from the fishing rod which may occur if the fishing rod ruler is provided in an adhesive form and only applied to an external surface of the fishing rod.

Figure 1:
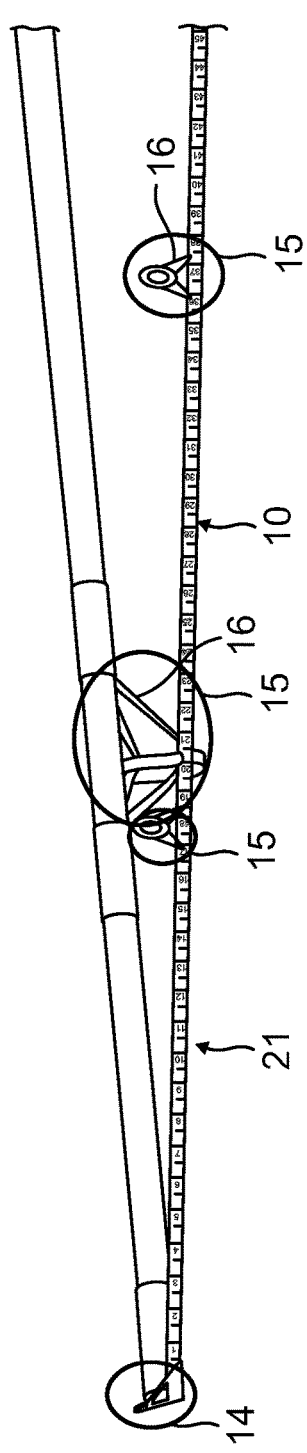
FIG. 1 is an isometric view of a two-part fishing rod with a fishing rod ruler of the present invention applied to the tip portion of the fishing rod according to a preferred embodiment of the present invention.
Figure 2:
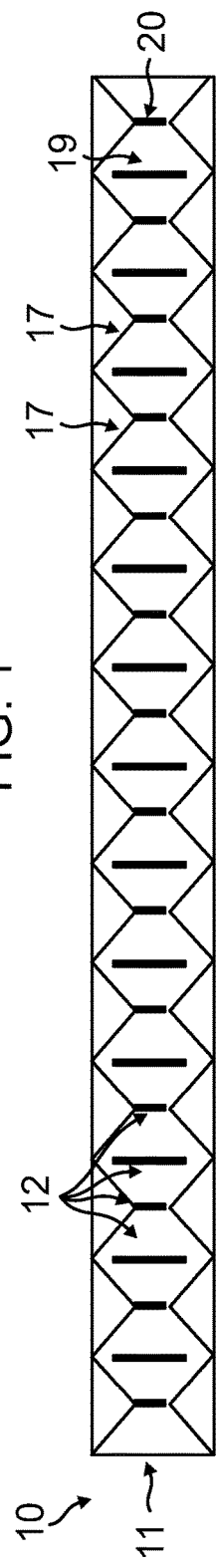
FIG. 2 is a plan view of a fishing rod ruler of a first preferred embodiment of the present invention.
Figure 3:
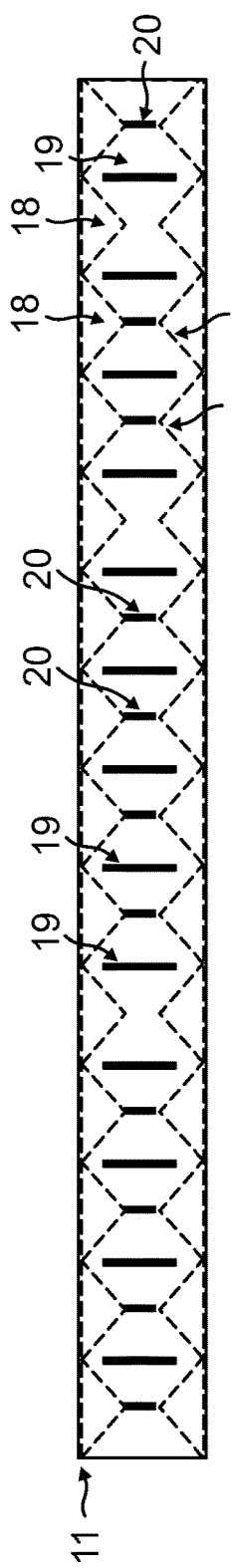
FIG. 3 is a plan view of a fishing rod ruler of a second preferred embodiment of the present invention.

The elongate flexible body of the ruler of the present invention is preferably manufactured from a plastic material or similar. Normally the body will be elongate as illustrated in FIGS. 1 to 3. The length of the elongate body may vary according to the type of fishing rod to which the body is to be at least temporarily applied. Normally, the body will be at least 12 inches in length (approximately 30 cm) and preferably up to 90 cm in length.

The elongate flexible body may have any shape, but will normally be substantially rectangular (albeit, in a preferred form, with one or more shaped portion is adapted for removal from the flexible body or with lines of weakness of frangibility).

The width of the elongate flexible body is particularly important given that the body will be at least temporarily applied to a cylindrical outer surface of a fishing rod which also typically tapers from the butt end of the fishing rod to the tip end of the fishing rod as illustrated in FIG. 1.

In the preferred form illustrated in FIG. 1, the elongate flexible body of the present invention is applied relative to a tip portion of the fishing rod and extend from the tip down the length of the fishing rod toward the butt. The tip end of the fishing rod is normally quite narrow which can cause application problems. The tip end of the fishing rod is also provided with a tip guide 14 as well as one or more body guides 15 which are mounted relative to the fishing rod and generally incorporated into the fishing rod via one or more feet and mounting arms 16. Therefore, the elongate flexible body of the present invention will also typically be required to provide for the location and number of the guides and particularly, the feet and mounting arms of each of the guides. In practice, the guides are not all spaced equally from the tip, nor other guides on different fishing rods provided in the same positions relative to the tip.

Figure 5:
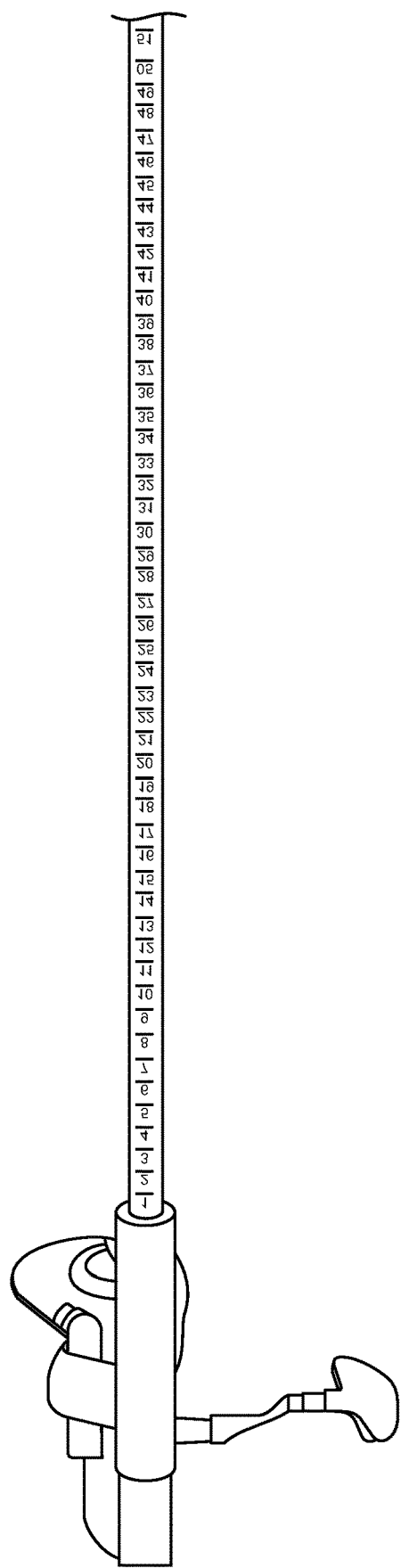
FIG. 5 is an axonometric view of a fishing rod with a fishing rod ruler of the present invention applied to the butt portion of the fishing rod according to a preferred embodiment of the present invention.

In the preferred form illustrated in FIG. 5, the elongate flexible body of the present invention is applied relative to a butt portion of the fishing rod and extend from the butt up the length of the fishing rod toward the tip. The butt has a free length before the body guides 15 start. The body guides are mounted relative to the fishing rod and generally incorporated into the fishing rod via one or more feet and mounting arms 16. Therefore, the elongate flexible body of the present invention will also typically be required to provide for the location and number of the guides and particularly, the feet and mounting arms of each of the guides.

In the preferred form illustrated in FIG. 2, the elongate flexible body 11 is provided with a number of shaped cutout portions 17 provided, on both lateral side edges of the elongate flexible body 11 in order to account for the guides, particularly the guide feet and arms on the fishing rod. The body 11 (whether adhesive or not) can then be removed from the backing substrate contemporaneously separating the body from the cutouts.

In the preferred form illustrated in FIG. 3, the elongate flexible body 11 is provided with one or more incisions, lines of weakness or frangible portions 18 may be provided on, preferably both lateral side edges and/or at least one end edge of the elongate flexible body to provide for the guides of the fishing rod. This allows a used to remove the substantially rectangular body 11 (whether adhesive or not) from the backing substrate and then to separate the frangible portions required (leaving the rest attached) in the locations required to account for the feet and mounting arms of each of the guides.

Either method above will preferably provide a number of shaped crenellations or similar on both lateral side edges of the elongate flexible body in order to allow for or account for the guide feet and/or mounting arms giving the external diameter of the tip portion of the fishing rod.

The shaped cutout portions, crenellations, or frangible portions are offset from the length markings so that the length markings provided on the elongate flexible body are provided in the wider parts of the body 11 as illustrated so as still to be easily read even if portions of the flexible body 11 are removed.

The body 11 of the preferred embodiment is manufactured from a non-extensible, non-resilient plastic material. The body will typically be flexible in order to be wrapped around a portion of the fishing rod at least temporarily.

The body of the ruler of the present invention will be provided with a number of length markings 12. Any type of length markings may be provided. It is preferred that the length markings include a number of spaced apart lines or similar as illustrated in order to indicate length.

In the preferred form illustrated, a plurality of spaced apart lines are provided substantially transversely across the body 11. At least some of the lines will typically be associated with numerals or similar in order to indicate length. The particular length measuring system used will depend upon the country in which the ruler is sold with some countries preferring the imperial system and some countries preferring the SI system. In a particularly preferred embodiment, where centimetres are used, the length markings 12 will be both centimetre markings 19 and half a centimetre markings 20.

It is preferred that length markings be easily viewable on the fishing rod in therefore, the length markings may be provided in a particular colour to contrast with the colour of the rod. A high contrast colour such as yellow or white are preferred and the markings may be luminous or reflective or similar as well.

The elongate flexible body is at least temporarily applied to a fishing rod. Where the elongate flexible body is self-adhesive, the body may simply be stuck onto an external surface of the fishing rod. However, in other embodiments, it may be that one or more layers of finishing material 21 such as resin or lacquer may be applied over either the body of the ruler in order to integrate the ruler into the construction of the rod or alternatively, over any markings which have been applied to an external surface of the rod in order that the markings be integrated into the construction of the rod.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

The invention claimed is:

1. A fishing rod with a tapering incorporated ruler, the tapering incorporated ruler having length markings provided by a substrate having an elongate flexible body with a number of length markings to provide markings onto the fishing rod, wherein
the elongate flexible body is only temporarily applied to the fishing rod whilst the markings are provided onto the fishing rod, and
the tapering incorporated ruler is provided beneath at least one finishing layer of resin or lacquer used to finish the fishing rod over at least the tapering incorporated ruler.

2. A fishing rod with a tapering incorporated ruler as claimed in claim 1 wherein the elongate flexible body is self-adhesive on a removable backing sheet or substrate.

3. A fishing rod with a tapering incorporated ruler as claimed in claim 1 wherein the markings are transferable onto the fishing rod.

4. A fishing rod with a tapering incorporated ruler as claimed in claim 1 wherein the length markings are in the form of one or more shaped cutouts or openings in order to allow a marking material to be applied over the top of the elongate flexible body in order to provide the markings on to the fishing rod.

5. A fishing rod with a tapering incorporated ruler as claimed in claim 1, wherein the elongate flexible body is manufactured from a non-extensible plastic material.

6. A fishing rod with a tapering incorporated ruler as claimed in claim 1, wherein the elongate flexible body is provided with a number of shaped cutout portions provided on both lateral side edges of the elongate flexible body.

7. A fishing rod with a tapering incorporated ruler as claimed in claim 1, wherein the elongate flexible body is provided with at least one shaped cutout portions provided on at least one end edge.

8. A fishing rod with a tapering incorporated ruler as claimed in claim 1, wherein the elongate flexible body is provided with a number of incisions provided on both lateral side edges of the elongate flexible body.

9. A fishing rod with a tapering incorporated ruler as claimed in claim 1, wherein the elongate flexible body is provided with at least one incision provided on at least one end edge.

10. A fishing rod with a tapering incorporated ruler as claimed in claim 1, wherein the elongate flexible body is provided with a number of lines of weakness provided on both lateral side edges of the elongate flexible body.

11. A fishing rod with a tapering incorporated ruler as claimed in claim 1, wherein the elongate flexible body is provided with at least one line of weakness provided on at least one end edge.

12. A fishing rod with a tapering incorporated ruler as claimed in claim 1, wherein the elongate flexible body is provided with a number of frangible portions provided on both lateral side edges of the elongate flexible body.

13. A fishing rod with a tapering incorporated ruler as claimed in claim 1, wherein the elongate flexible body is provided with at least one frangible portion provided on at least one end edge.

14. A fishing rod with a tapering incorporated ruler as claimed in claim 1, wherein the elongate flexible body has alternating wider portions on the body and narrower portions on the body with the length markings provided in the wider parts of the body.

15. A fishing rod with a tapering incorporated ruler as claimed in claim 1, wherein the length markings are provided in a high contrast colour.

16. A fishing rod with a tapering incorporated ruler as claimed in claim 1, wherein the length markings are luminous or reflective.

17. A fishing rod with a tapering incorporated ruler as claimed in claim 1, wherein the length markings are decal transfers.

18. A method of forming a fishing rod with a tapering ruler incorporated thereinto, including the steps of
providing a substrate having an elongate flexible body with a number of length markings provided thereon,
temporarily positioning the substrate adjacent to a portion of the fishing rod,
providing markings onto the fishing rod to form the tapering incorporated ruler,
removing the substrate from the fishing rod, and
applying at least one finishing layer used to finish the fishing rod over the tapering incorporated ruler and at least an adjacent part of the fishing rod.

19. A method of forming a fishing rod with a tapering incorporated ruler as claimed in claim 18 wherein the substrate is positioned adjacent to a tip portion of the fishing rod.

20. A method of forming a fishing rod with a tapering incorporated ruler as claimed in claim 18 wherein the substrate is positioned adjacent to a butt portion of the fishing rod.

21. A method of forming a fishing rod with a tapering incorporated ruler as claimed in claim 18 wherein the length markings are decal transfers.

* * * * *